R. P. PICTET.
PROCESS OF INCREASING THE INTENSITY OF INCANDESCENT LIGHT.
APPLICATION FILED JAN. 19, 1904.
1,026,121.
Patented May 14, 1912.
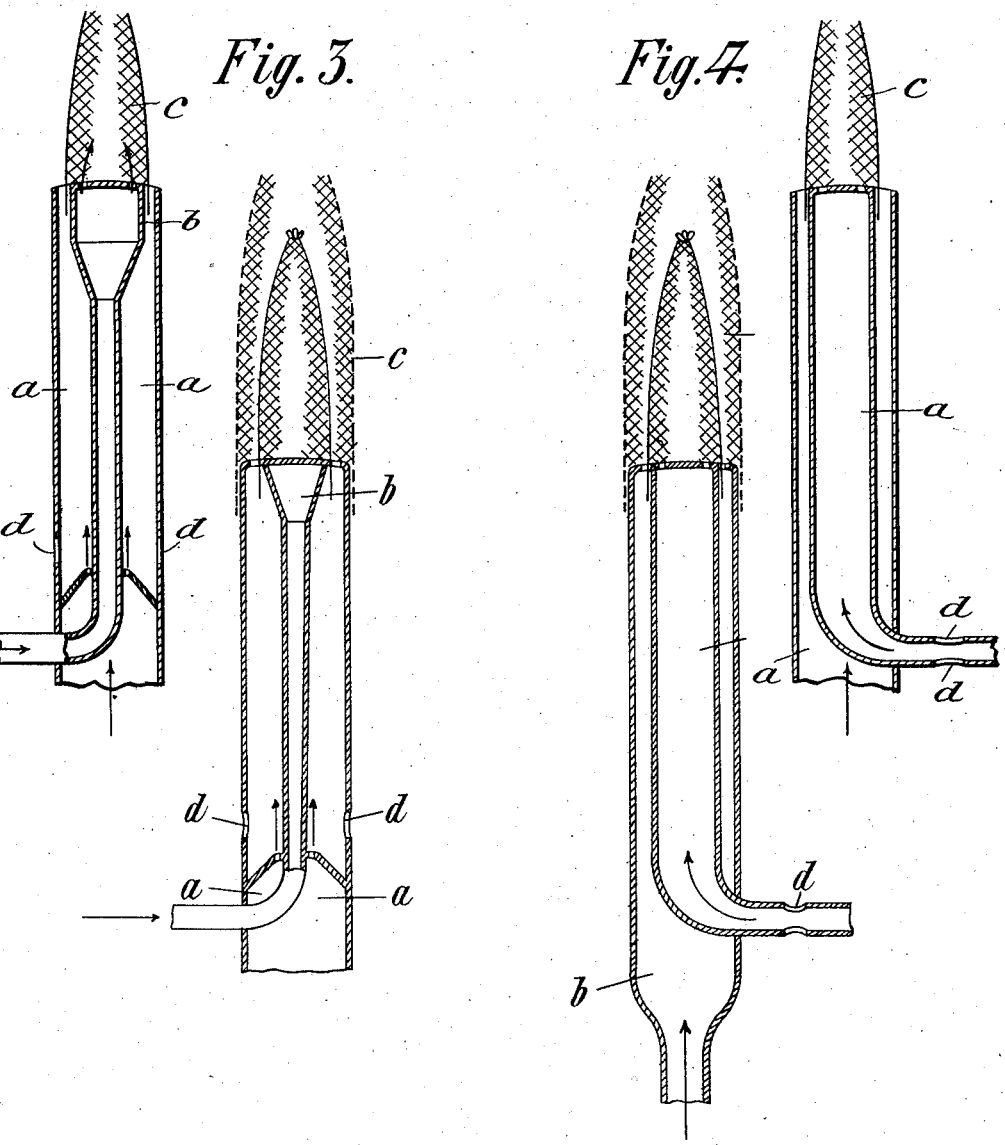

R. P. PICTET.
PROCESS OF INCREASING THE INTENSITY OF INCANDESCENT LIGHT.
APPLICATION FILED JAN. 19, 1904.
1,026,121.
Patented May 14, 1912.
2 SHEETS—SHEET 2.
Fig. 5.
Fig. 6.
Fig. 7.
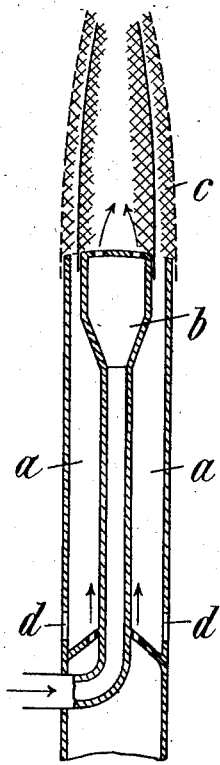
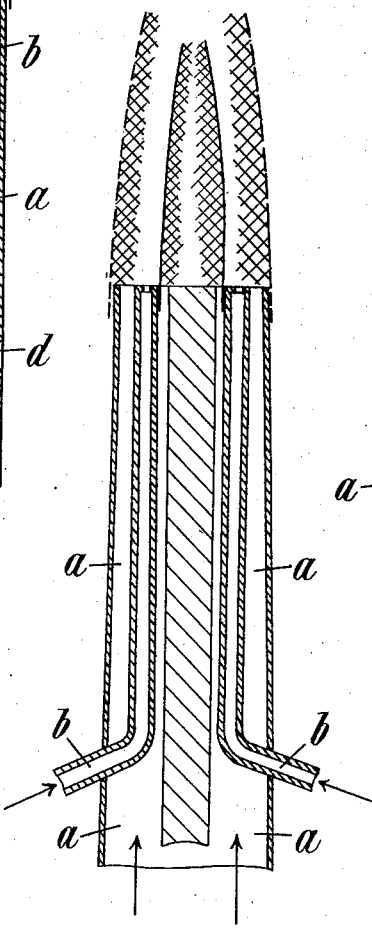
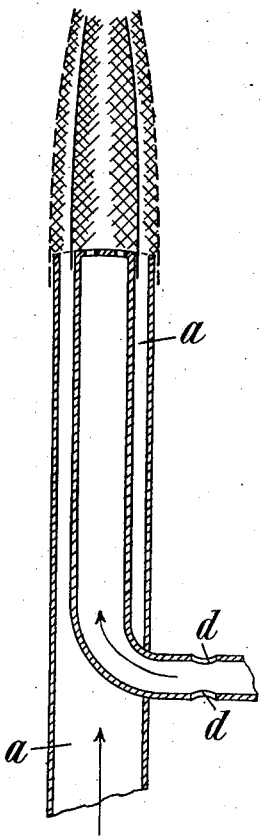

UNITED STATES PATENT OFFICE.

RAOUL PIERRE PICTET, OF BERLIN, GERMANY, ASSIGNOR TO THE FIRM OF SAUERSTOFF-INDUSTRIE AKTIENGESELLSCHAFT, OF BERLIN, GERMANY.

PROCESS OF INCREASING THE INTENSITY OF INCANDESCENT LIGHT.

1,026,121. Specification of Letters Patent. Patented May 14, 1912.

Application filed January 19, 1904. Serial No. 189,775.

*To all whom it may concern:*

Be it known that I, RAOUL PIERRE PICTET, professor and doctor of philosophy, a citizen of Switzerland, residing at and whose post-office address is 2 Wattstrasse, Berlin, Prussia, German Empire, have invented new and useful Improvements in Processes of Increasing the Intensity of Incandescent Light, of which the following is a specification.

In the accompanying drawing various constructional forms of burner for carrying the invention into practice are illustrated in longitudinal sectional view.

Figures 1 and 2 show a burner with one incandescent mantle. Figs. 3 to 7 with two incandescent mantles.

Similar letters refer to similar parts throughout the several views.

$a$ is the gas conduit, $b$ the oxygen conduit, $c$ the incandescent mantle, $d$ the air supply openings for a Bunsen burner.

The incandescent mantle may be so arranged that it surrounds the exterior burner tube (Figs. 3, 4, 5 and 6). It may also be placed within the area inclosed by the exterior burner tube. (Figs. 1, 2, 3 and 4). In the arrangement illustrated in Fig. 5 a gauze of refractory oxid surrounds the exterior burner tube, a second tube being concentrically arranged in the mixing tube. In the arrangement illustrated in Fig. 7 within the said second tube a further gauze of refractory oxid is arranged.

The object of this invention is to permit of the practical utilization of the known Stephan-Boltzmann law of radiation in connection with the increase of the light emission by heating a body to a far greater extent than has hitherto been effected technically. As is known, the total radiation of a heated body increases in a measure lying between the fourth and fifth power of the absolute temperature of the incandescent body. On the other hand the practical experiments and theoretical calculations of Kurlbaum, Wien, Pringsheim, Lummer and others show that the displacement of the radiation energy maximum toward the blue side of the spectrum takes place rapidly, so that the visible radiation actually takes place on an average to the twelfth power of the absolute temperature.

By means of the method or process which forms the subject of this invention it is possible to bring a body which is *per se* an illuminant body, such for example as nets or rods of the known common and rare metallic alkaline earths, into the hottest zone of a flame which is of itself extremely hot, and thereby heat the net or the like in such a manner that the light emitted by it is far greater than it is possible to attain by other means. Although it is not possible for obvious reasons to obtain in practice results equal to theoretical calculations, under certain conditions a luminous efficiency is obtained which approximates fairly closely the theoretical efficiency. The process may be carried into practice in various ways.

1. The first method consists in conducting within an incandescent body combustible gas rendered non-luminous by a Bunsen burner or other means, while externally oxygen or air rich in oxygen is led over the incandescing body.

2. In accordance with the second method the air or the oxygen is conducted within the said incandescing body while the combustible gas is led over it.

3. In a third method, which constitutes a combination of the first two, the air or oxygen is conducted by means of a concentric slit in such a manner that the oxygen flows in between two atmospheres of gas so that an extremely intimate mixture of the oxygen and the gas takes place outside the burner.

4. A fourth method consists in passing a second mantle over the first, gas being conducted within the inner mantle and oxygen into the space between the two mantles.

5. A fifth method consists in admitting oxygen within the inner incandescing body and combustible gas into the space between the two incandescing bodies.

6. A sixth method is a still further extension of the process and is based upon the provision in the method No. 5 of an additional atmosphere of oxygen through suitable tube slots or holes, whereby the outer mantle is caused to fulfil the same function as the incandescent body in method 1, by which means two superposed bright illuminating nets are obtained. Notwithstanding the fact that in accordance with Kirchhoff's and Bunsen's laws a portion of the radiation of the inner incandescent body is absorbed by the mass of the outer body, the interstices of the outer net still permit of the passage of so much light that increased illuminating power is obtained. It is, however, possible to so select the composition of the incandescing bodies having regard to the said fundamental physical law, that they emit different light, that is to say light of a different wavelength, so that by selecting totally different elements, the whole of the radiant energy may be permitted to escape.

The essential feature of the novel method consists, in addition to the appropriate constructions of the burners which are illustrated in the accompanying drawing, more particularly in the fact that these same arrangements result in an almost constant contact of oxygen or air upon one wall of an incandescent body and combustible gas on the other wall. Further, the construction of the gas supply-passages is such that they permit of the issue of the gases under pressure in concentric superposed cylinders. If two gases differing from each other to such an extent and coming from two different sides meet on the wall of an incandescent body, it is obvious that the hottest point of the flame formed will necessarily be found at the meeting point. On the other hand the fact that in the other burners for example a cylinder of oxygen is surrounded by a hollow cylinder of gas, both of which flow to meet each other in the same direction or at an acute angle, causes an incandescent body situated in the contact surface to likewise be in the hottest part of the flame. The gases are sent under different pressures from the pipes in longitudinal directions. In other words the velocities of the gas streams are different. By the movement of the gas streams a suction action is exercised. This suction action sucks the gas from the one side to the opposite side. With reference to the fact that the two gases are subjected to a certain pressure in a longitudinal direction, the gases are prevented from spreading out. The main amount will have the outline of the mantle. A mixture of the gases will only occur at those points where they are in direct connection. The chief amount of the gases follows however the outline of the mantle. This is due to the difference of the pressure under which the gases are handled.

The novel process also differs from known burners in which air and gas mingle together in a tube owing to the fact that here (as already stated) the gases issue separately. The burners are, however, also different from the usual oxy-hydrogen burners to the extent that the likewise novel multiplication of the blast action is attained by the said cylindrical gas outlet tubes with the assistance of a very simple device.

A further characteristic feature of the novel process consists in the fact that all the arrangement described tend to the production of the phenomenon that by suitably differentiating the gas pressure the gases will to a certain extent come in contact with each other only where an opening in the mantle is situated, so that each of these openings acts as a gas blast aperture, which finally results in enabling the limiting surfaces of these small openings to withstand the highest possible temperature of the flame. The novelty of the process also resides in the fact that contrary to what is the case with previous inventions, in which reliance is placed upon the capacity for suction of the flame (which is extremely defective), the oxygen required to support combustion and for producing the highest temperature is introduced in a conduit and under pressure at the place at which it produces the greatest effect. As already stated the combustible gas is employed in a non-luminous condition, and it is immaterial whether this is attained by mixing the gas with air in a Bunsen tube or whether oxygen alone is forced under pressure into the mixing tube, in which latter case Davy gauzes for preventing the flame from lighting back must be employed. It is unimportant whether these gauzes are suspended above the burners or extend within them.

What I claim, and desire to secure by Letters Patent of the United States, is:—

The process for increasing the intensity of incandescent lights, which consists in conducting streams of nonluminescent hydrocarbon gas and oxygen in the same vertical direction under different pressures to opposite sides of the mantle, and in contact with the said surfaces of the mantle, the height of the pressures being so chosen that the stream of increased pressure upon one side of the mantle draws by its movement the stream of lesser pressure upon the other side of the mantle through the meshes or openings of the mantle.

In witness whereof I have hereunto signed my name this twenty-fifth day of November, 1903, in the presence of two subscribing witnesses.

RAOUL PIERRE PICTET.

Witnesses:
JEAN LEUGEISE,
HANSON C. COXE.